Patented Sept. 18, 1923.

1,468,389

UNITED STATES PATENT OFFICE.

HARRY W. MORSE, OF STANFORD UNIVERSITY, CALIFORNIA, ASSIGNOR TO WEST END CHEMICAL COMPANY, OF OAKLAND, CALIFORNIA, A CORPORATION OF CALIFORNIA.

METHOD OF CONCENTRATING BRINES.

No Drawing.   Application filed September 6, 1921.   Serial No. 498,868.

*To all whom it may concern:*

Be it known that I, HARRY W. MORSE, a citizen of the United States, residing at Stanford University, in the county of Santa Clara and State of California, have invented a new and useful Method of Concentrating Brines, of which the following is a specification.

This invention relates to the concentration of brines containing salts of potassium and sodium, and particularly to the concentration of Searles Lake brine (occurring at Searles Lake, California), the main object of the invention being to provide for a relatively high concentration of potassium salt by means of solar evaporation.

The brine of Searles Lake has the following approximate composition in grams of salt per liter:

| | |
|---|---|
| Potassium chloride | 63.0 |
| Sodium chloride | 210.0 |
| Sodium biborate | 20.5 |
| Sodium carbonate | 68.0 |
| Sodium sulfate | 84.0 | and this brine has a temperature of about 21° C. as it is pumped from the wells.

At the temperature at which it is pumped from the salt-body any concentration by solar evaporation results in the formation of a solid salt (Glaserite) containing potassium.

At higher temperatures, such as are found for a considerable part of the year at Searles Lake, concentration can be carried on to some extent without the formation of solid salts containing potassium, but only a comparatively slight concentration can be attained in this way.

I have found that it is possible to obtain concentration to a much higher point by control of the sulfate content of the brine, so as to decrease the concentration of the sodium sulfate.

Sodium sulfate can be removed from the brine by heating the brine with waste salts containing sodium chloride and sodium carbonate. Salts useful for this purpose are produced as tailings during the leaching of crude solar salts for the purpose of extracting potassium salts and borax from them. These solid salts constituting the tailings resulting from the leaching of crude solar salts as described have approximately the following composition:

| | |
|---|---|
| Potassium chloride | 2.0% |
| Sodium chloride | 50.0 |
| Sodium biborate | 1.0 |
| Sodium carbonate | 14.0 |
| Sodium sulfate | 20.0 |
| Water | 13.0 |

The raw brine to be treated is mixed or placed in contact with these solid salts and heated to near the boiling point of water for from one-half hour to two hours.

Raw brine which has been heated to near the boiling point of water in the presence of waste salts containing sodium chloride and sodium carbonate has the following approximate composition in grams per liter:

| | |
|---|---|
| Potassium chloride | 65.0 |
| Sodium chloride | 270.0 |
| Sodium biborate | 21.0 |
| Sodium carbonate | 50.0 |
| Sodium sulfate | 35.0 |

After treatment in this way the brine can be concentrated at a minimum temperature of 21° C. to a potassium chloride content of over 100 grams per liter without the separation of any solid potassium salt.

When a solar pond has once been started with brine which has been treated for the removal of sulfates, as described, and after evaporation has proceeded sufficiently to raise the carbonate to a high concentration, say 100 grams per liter, raw brine, which has not been previously treated in any way, can be added to the brine already concentrated, without separation of any solid salt of potassium.

For example, after heat-treatment with waste salts, and after exposure to solar evaporation, a concentrated brine may contain:

| | Grams per liter. |
|---|---|
| Potassium chloride | 105.0 |
| Sodium chloride | 200.0 |
| Sodium carbonate | 110.0 |
| Sodium sulfate | 58.0 |
| Sodium biborate | 35.0 |

Raw brine can now be added to this pond in volume sufficient to dilute to 90 grams of potassium chloride per liter. After a few days of evaporation the total volume will return to the original concentration of 105 grams per liter of potassium chloride. More raw brine can then be added and the process continued.

Instead of raw brine, that is to say brine taken direct from Searles Lake, it is also possible under certain conditions to use brine which has been previously evaporated in preliminary ponds at sufficiently high temperature to prevent the loss of potassium by the formation of solid potassium salts, such partially concentrated brine being added to the prepared pond in the same manner as above described in the case of the addition of raw brine. In this connection it may be stated that the brine pumped from the body of liquid at Searles Lake at a considerable depth below the surface is at a temperature of about 21° C. and could not be concentrated without loss of potash at this temperature. But during the hotter portion of the year brine exposed in shallow ponds will have a minimum temperature considerably above 21° C. and it is possible to concentrate in such ponds to about 80 grams per liter of potassium chloride without loss of potassium in solid form, starting with 65 grams per liter in the raw brine. This partially concentrated raw brine containing 80 grams of potassium chloride per liter is then removed to the prepared ponds for dilution, such prepared ponds having a low content of sodium sulfate and a high content of sodium carbonate by reason of the preparatory treatment above described.

A brine containing sodium and potassium salts in the proportions of Searles Lake brine can be concentrated to over 100 grams per liter of potassium chloride without loss of potassium by formation of solid potassium salts provided the sodium carbonate concentration is kept at a high figure and provided the minimum temperature of the pond does not fall below 21° C.

Under the conditions of pond operation described above sodium sulfate is removed from the brine in the form of a double sulfate-carbonate of sodium. This substance is slightly soluble compared with either the sulfate or the carbonate, when the concentration of either sodium sulfate or sodium carbonate in the brine is high. If the sodium sulfate content of the brine is made high, the double sulfate-carbonate will crystallize out until the sodium carbonate content of the residual brine is low. If the sodium carbonate content is high, the double sulfate-carbonate will crystallize out until the sodium sulfate concentration of the residual brine is low.

For the purpose of concentrating such a brine in potassium, it is desirable that the sodium sulfate content of the brine be kept as low as possible. This can be attained keeping the sodium carbonate high.

The purpose of the preliminary treatment of the brine is, therefore, to make a brine low enough in sulfate so that it can be carried to a high concentration of sodium carbonate by solar evaporation without separation of solid potassium salts.

Once the treated brine has been concentrated to a high carbonate content, raw brine can safely be added, as the high carbonate content causes the separation of the double sulfate-carbonate and the sulfate content of the brine is in this way kept low.

Where it is desired to produce a crude salt as high as possible in potassium by solar evaporation, it is evidently of advantage to be able to concentrate the brine in preliminary ponds up to 100 grams of potassium chloride per liter, then moving this concentrated brine to other ponds in which it is evaporated to approximate dryness.

When the original raw brine of Searles Lake is evaporated to dryness the dry salt will contain approximately:

| | |
|---|---|
| Potassium chloride | 14.0% |
| Sodium chloride | 47.0 |
| Sodium biborate | 4.5 |
| Sodium carbonate | 15.5 |
| Sodium sulfate | 19.0 |

A brine which has been concentrated with control of the sulfate content up to 100 grams of potassium chloride per liter will give a dry crude salt of the following approximate composition:

| | |
|---|---|
| Potassium chloride | 20.0% |
| Sodium chloride | 40.0 |
| Sodium biborate | 7.0 |
| Sodium carbonate | 22.0 |
| Sodium sulfate | 11.0 |

Other methods of control of the sulfate content of the brine for removal of sodium sulfate therefrom preliminary to solar evaporation may also be used, for example, the brine may be subjected to a preliminary chilling operation, for example, to about 0° C., resulting in separation of sodium sulfate with a part of the sodium biborate present, and the resulting brine then subjected to successive solar evaporation stages with addition of raw brine after each stage; or the removal of the sodium sulfate may be effected by heating the raw brine in the presence of solid sodium chloride, say to near the boiling point for from one-half hour to two hours, and the resulting brine then subjected to solar evaporation in successive stages with the addition of raw brine at each stage. The specific embodiments of my invention embodied in these last processes are disclosed in other applications of even date herewith, and are not specifically claimed herein.

What I claim is:

1. The method which consists in controlling the sulfate content of Searles Lake brine during solar evaporation by the use of a brine high in carbonate to start the pond operation, and the gradual addition of raw brine concentrated by preliminary evaporation at such a temperature as will prevent the separation of solid potassium salts, to the prepared brine, the operation being so conducted that the original high carbonate and low sulfate content are restored by evaporation before further addition of raw brine to the pond.

2. The method which consists in controlling the sulfate content of Searles Lake brine during solar evaporation by the maintenance of a sufficiently high sodium carbonate concentration to cause the separation of solid sulfate-carbonate of sodium during the evaporation.

3. The method which consists in continually controlling the sulfate content of Searles Lake brine during concentration by solar evaporation, by the addition of raw brine, concentrated by preliminary evaporation at such a temperature as will prevent the separation of solid potassium salts, to a prepared brine high in sodium carbonate, and by the maintenance of a minimum temperature of 20° C. during the evaporation.

4. The method of producing a brine high in potassium from Searles Lake brine which consists in maintenance of a low sulfate content of the brine during concentration by solar evaporation, the low sulfate content being maintained by a high carbonate content in the brine.

5. A method of operating solar ponds for the evaporation of Searles Lake brine characterized by the following steps: first, starting the pond with brine from which a part of the sulfate has been removed; second, evaporation of this treated brine to a high carbonate content; the addition of raw brine concentrated by preliminary evaporation at such a temperature as will prevent the separation of solid potassium salts; third, evaporation to the potassium concentration of such second step of the operation; again adding raw brine concentrated by preliminary evaporation at such a temperature as will prevent the separation of solid potassium salts; and repeating the evaporation to the potassium concentration of the second step of the operation; and the addition of brine as aforesaid until the desired potassium content is attained.

6. A process for the concentration of Searles Lake brine for potassium salts, consisting in removal of a part of the sodium sulfate of the brine by preliminary treatment; evaporating the treated brine to a high carbonate content; the addition in successive portions, of raw brine concentrated by preliminary evaporation at such a temperature as will prevent the separation of solid potassium salts, to the brine high in carbonate, in such amounts and in such a way that the high carbonate content of the brine is in each step restored to its original value, before further addition of raw brine.

7. A process for the concentration of potassium salts in Searles Lake brine, including the preliminary step of removing sulfate from a portion of the total volume of brine to be evaporated, the concentration of the de-sulfated brine to a high carbonate content, and the addition of raw brine concentrated by preliminary evaporation at such a temperature as will prevent the separation of solid potassium salts, from time to time to the concentrated brine, raw brine concentrated by preliminary evaporation at such a temperature as will prevent the separation of solid potassium salts, being added as sulfate is precipitated and after the carbonate content has been restored by evaporation to its original value in the de-sulfated, concentrated brine.

8. The method of removing a part of the sodium sulfate from Searles Lake brine, which consists in heating the brine with waste salts containing the chloride and the carbonate of sodium, to a temperature approaching the boiling point of water, and maintaining this temperature for from half an hour to two hours.

In testimony whereof I have hereunto subscribed my name this 8th day of August, 1921.

HARRY W. MORSE.